Figure 1:
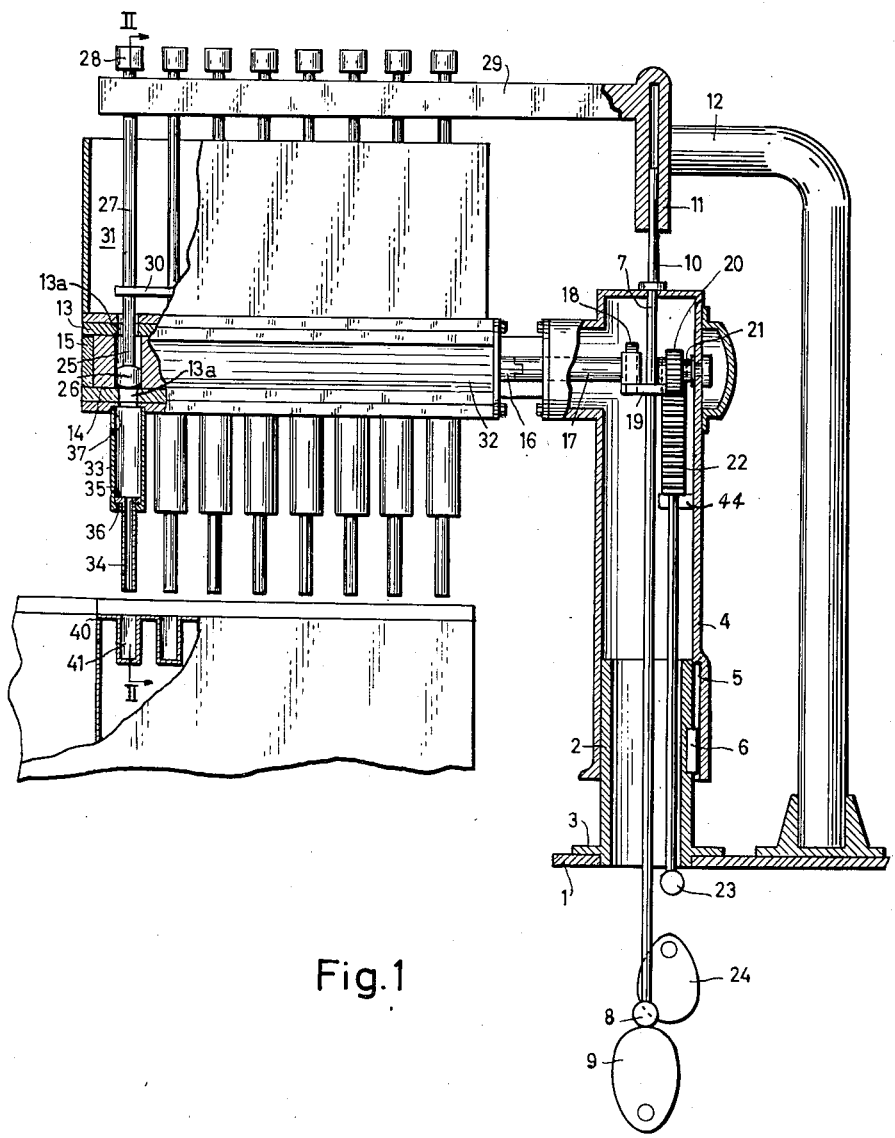

Dec. 20, 1960 O. G. HÖYER 2,965,141
FILLING MACHINE FOR A ROTARY ICE-CREAM
BRICK FREEZING MACHINE
Filed Dec. 12, 1955 2 Sheets-Sheet 1

OLUF G. HÖYER
INVENTOR

BY Wenderoth, Lind & Ponack
ATTORNEYS

Dec. 20, 1960 O. G. HÖYER 2,965,141
FILLING MACHINE FOR A ROTARY ICE-CREAM
BRICK FREEZING MACHINE
Filed Dec. 12, 1955 2 Sheets-Sheet 2

OLUF G. HÖYER
INVENTOR

BY Wenderoth, Lind & Ponack
ATTORNEYS

United States Patent Office 2,965,141
Patented Dec. 20, 1960

2,965,141

FILLING MACHINE FOR A ROTARY ICE-CREAM BRICK FREEZING MACHINE

Oluf Gudmund Höyer, 131 Ny Munkegade, Aarhus, Denmark

Filed Dec. 12, 1955, Ser. No. 552,607

Claims priority, application Denmark Dec. 17, 1954

4 Claims. (Cl. 141—181)

The invention relates to a method of inserting measured-out portions of a plastic mass into freezing cells in a freezing machine, particularly the inserting of ice-cream into the freezing cells in a rotary ice-cream brick freezing machine such as that shown in my U.S. Patent No. 2,791,-890, by means of a filling machine which has outlet tubes which are in connection with a supply container. In an ice-cream brick freezing machine used in practice there is provided above the freezing table a filling machine which is stationary during the operation and from which there is forced downwardly through stationary outlet tubes measured-out portions of ice-cream into the underlying freezing cells. When this method is used it is necessary that the ice-cream forced out be comparatively thin, as otherwise there is a risk of the formation of air pockets. The basis for the present invention is, however, the realization that it would be advantageous if it were possible to use a plastic mass, e.g. ice-cream, which has already been subjected to freezing and has thereby attained a higher viscosity. In conformity with this, the purpose of the present invention is to provide a method and a filling machine which permit the use of a pre-frozen plastic mass as a starting material for the filling of the freezing cells in the freezing machine.

The problem is solved according to the invention by the outlet tubes being moved down towards the bottom of the freezing cells and then being pulled upwards while at the same time the plastic mass flows out of the outlet tubes, so that the freezing cells are filled from the bottom. Even in the case of pre-frozen ice-cream of a rather high viscosity, air pockets will be avoided during the filling of the freezing cells. The use of a plastic mass, which is partly frozen, entails the advantage that the capacity of the freezing machine can be increased, as the plastic mass filled into the freezing cells need only be subjected to a further freezing for a shorter period to assume the final solid consistency desired.

The invention furthermore relates to a filling machine for carrying out the said method, said machine having outlet tubes connected to a portioning mechanism and a supply container, and the characteristic feature of the invention is a vertically movable carrying member carrying the portioning mechanism with the outlet tubes and the supply container. By letting the carrying member carry not only the outlet tubes, but also the portioning mechanism and the supply container, the use of complicated movable connections between the outlet tubes and the remaining part of the filling machine is avoided.

In an expedient embodiment of the filling machine according to the invention the carrying member is formed by a substantially cylindrical sleeve which can slide axially on a stationary, tubular shaft. A strong construction is obtained, and the necessary members for causing the movements desired can be led through the tubular shaft.

According to the invention, the carrying member and the shaft may be guided in relation to each other by means of a groove-and-feather connection or a similar connection, the length of which is just great enough so that the carrying member can be released by lifting it slightly so that it can be turned freely around the shaft. Thus during the operation of the device the carrying member takes a certain fixed position in relation to the freezing cells to be filled, while at the same time it will nevertheless be possible to swing the portioning mechanism clear to enable it to be cleaned.

In an ice-cream brick freezing machine, in which no special measures have been taken for ensuring that the freezing cells are always empty when they get under the filling machine, difficulties might be encountered by the use of the filling machine according to the invention when, during their downward motion, the outlet tubes happened to hit a hard-frozen ice-cream brick that has not been removed. According to the invention these difficulties can, however, be overcome by the outlet tubes, which are connected to the underside of the portioning mechanism, being designed as telescopic tubes that can be displaced inside each other, which tubes are made to telescope when during their downward movement the lower end of the tube meets a resistance. When the filling machine once more moves upwards, the telescopic tubes are once more caused to slide out of each other, so that the particular outlet tube is ready to fill the next cell in the proper manner from the bottom up.

Figure 2:
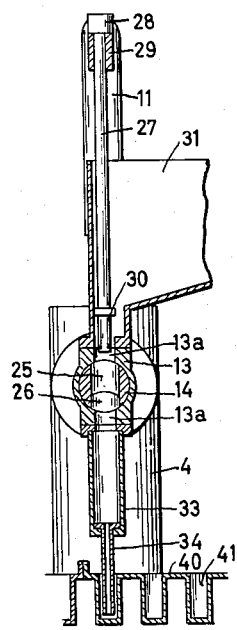
Figure 3:
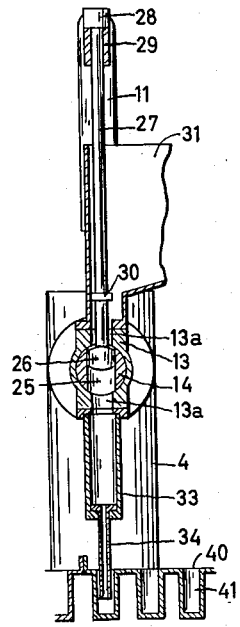

The invention will be explained on the basis of an embodiment of a filling machine according to the invention illustrated in drawings, in which:

Fig. 1 is an elevation view, partly in section and partly diagrammatic of the filling machine according to the invention; and Figs. 2 and 3 are sectional views on line II—II of Fig. 1 showing the parts at different times in the operation of the filling machine.

In the drawing, 1 designates a stationary frame or a support, to which a hollow, vertical shaft 2 is secured by means of a flange 3 on the latter. Around the shaft 2 a tubular carrying member 4 can slide. A groove-and-feather connection 5, 6 is provided to ensure an axial displacement of the tube 4 in relation to the shaft 2 without any turning. This connection, however, is just long enough so that the tube 4 can be released by a sufficiently large displacement in the vertical direction from the groove-and-feather connection so that the tube can be turned freely on the shaft 2.

The tube 4 is fixed to a control rod 7, which on the lower end carries a roller 8 which is actuated by a cam disc 9 which is driven from the main shaft of the machine and which causes the normal up- and downward movement of the filling machine.

The control rod 7, which is secured to the carrying member 4, preferably at top, may have an extension 10 which is guided in a guide 11 which is fixed to an overhanging portion of a bracket 12 which rests on the support 1 beside the shaft 2 and is fixed to the support 1.

The carrying member 4 carries at its top the portioning mechanism which comprises a substantially cylindrical case 13 which can be termed a pump case. The pump case or pump cylinder 13 is provided with a cylindrical bore in which a cylindrical drum 14 can turn and has at one end thereof a cover 15 which prevents drum 14 from sliding out, and which at the other end has a shaft pin 16 which can be connected to a driving mechanism by a claw clutch. The driving mechanism consists of a shaft 17 carrying a ratchet wheel 18 actuated by a pawl 19 mounted on a gear wheel 20, which can rotate around a shaft 21 and which is actuated for turning by means of a toothed rack 22 which extends down through the hollow shaft 2 and terminates in a roller 23 which is actuated by a cam disc 24 which is connected to the main shaft of the machine. The pump cylinder 13 also has a plurality of pairs of diametrically opposed bores 13a in the wall thereof.

The drum 14 is provided with a row of cylindrical bores 25 which extend at right angles to the direction of the axis of the drum and all have their axes located in a plane through the axis of the drum. These bores are aligned with and slightly larger than bores 13a. In the cylindrical bores 25, of which in the case shown there are eight, slide loose pistons 26, one piston in each cylindrical bore. The sliding of pistons 26 is limited by the smaller size of the bores 13a in the pump cylinder. The pistons 26 move during the operation in part due to their gravity, and in part due to the presence of weights 27 in the form of rods which are vertical and at the top are provided with an enlargement 28 which prevents the rods from moving farther downwards than the position in which the enlargements 28 contact a stationary carrying arm 29 mounted on the bracket 12 and provided with holes through which the rods 27 pass. Moreover, a guide 30 for the rods 27 is provided, and this guide is secured inside a supply container 31, through which the rods 27 also extend and which is fixed to the pump case 13.

The pump cylinder 13 is provided with a flange on its lower side to which is secured a bottom cover 32 with outlet tubes consisting of two parts 33 and 34 which can be telescoped into each other. The telescopic outlet tube 34 terminates at the top in an outwardly projecting collar 35 which together with an inwardly directed collar 36 at the end of the tube 33 prevent the tube 34 from being pulled out of the tube 33. The tube 33 may be screwed or welded to the bottom cover 32, and the bottom cover may be provided with an inwardly projecting collar 37 which prevents the tube 34 from being pushed upwards into the cylindrical bores 25. Instead of the collar 37 on the tube 33, an outwardly directed collar may be provided on the tube 34.

When the filling machine according to the invention is used in connection with an ice-cream brick machine, its movements are synchronized with those of the ice-cream brick machine, its driving members 9 and 24, respectively, being coupled to the main shaft of the ice-cream brick machine.

From the position illustrated on the drawing the filling machine starts its movement by the cam disc 9 turning and permitting the roller 8 and thereby the rod 7 and the carrying member 4 with the portioning mechanism to move downwards towards the diagrammatically shown freezing table 40 with freezing cells 41 arranged in circular and radial rows as shown in my U.S. Patent 2,791,890. The number of outlet tubes 33, 34 corresponds to the number of freezing cells in a row, and each tube 34 passes down into its freezing cell and will by contact with frozen substance which may inadvertently remain in the bottom of the freezing cell be telescoped up into the tube 33. Upon the downward movement of the portioning mechanism, the enlargement 28 comes into contact with the carrying arm 29. During the further downward movement of the carrying member 4 the rods 27 therefore remain stationary, and during the last part of the downward movement the cylinder bores 25 are led clear of the rods 27, so that the drum 14 can be turned without the rods 27 becoming jammed.

From the supply container 31 ice-cream runs into the bores 25 above the pistons 26 in a measured quantity by volume corresponding to the volume of the cylinder bore 25 minus the volume of the piston 26. Near the end of the downward stroke where the position is as seen in Fig. 2, the drum 14 is free to turn without interfering with the rods 27 and consequently the ends of outlet tubes 34 are near the bottom of the freezing cells. At this point the cam disc 24 contacts the roller 23 which lifts the toothed rack 22 upwards from stop 44 and thereby turns the gear wheel 20 which through the pawl mechanism 19, 18 turns the drum 14 180° by means of the shafts 16 and 17 connected by a claw clutch. With the turning of the drum 14, the pistons 26 are moved to their uppermost position in the cylindrical bores (see Fig. 3) with a measured-out portion of ice-cream underneath them. When next the portioning mechanism once more moves upwards due to actuation from the cam disc 9 through the roller 8 and the rod 7, the rods 27 contact the pistons 26, so that the latter will remain substantially stationary in space, while the drum 14 moves upwards, and thereby the ice-cream is forced out of the telescopic outlet tubes 33, 34 and filled into the freezing cells from the bottom of the latter upwards. The consistency of the ice-cream may be rather heavy, since when the freezing cells are filled from the bottom up there is considerably less risk of the occurrence of air pockets, as is the case when the ice-cream is forced into the freezing cells from the top of the latter.

When the outlet tube 34 is clear of the freezing cells 41, the freezing table is advanced one step, so that the next radial row is made to stand in line with the row of outlet tubes 34, as is described in my Patent 2,791,890, whereupon the cycle described above is repeated.

Besides the advantages already mentioned, the telescopic outlet tubes also possess the advantage that damage is prevented if for some reason or other the synchronism between the freezing table 40 and the portioning mechanism should fail, e.g. due to manual interference.

Even if the portioning mechanism moves downwards towards the freezing table at a point where the freezing cells are not in line with the outlet tubes 34, nothing will happen, the tubes 34 merely being pressed up into the tubes 33. The same advantageous effect will assert itself if due to failing of the removal mechanism a block of ice-cream should have been left in one of the freezing cells.

The invention is not limited to the embodiment shown, as e.g. the outer design of the frames as well as the driving mechanisms may be designed otherwise. The sleeve 4 may lie inside the hollow shaft 2, and the shaft 2 may be solid, in which case the driving members must pass through a special channel or lie outside the shaft. The filling machine according to the invention may also be used in combination with an ice-cream brick freezing machine with a linear advance of the freezing cells. The use of telescopic outlet tubes is not necessary for the main invention.

I claim:

1. A filling machine for an ice-cream brick freezing machine having freezing cells arranged in rows and means for passing said rows under the filling machine, said filling machine comprising a vertically movable carrying member in the form of a substantially cylindrical sleeve, a stationary tubular shaft on which said sleeve is axially slidable, said shaft having guiding means thereon cooperating with said sleeve for preventing rotation of said sleeve during normal axial sliding, a portioning mechanism on said carrying member having unobstructed outlet tubes of a length to reach substantially to the bottom of the freezing cells in the lowermost position of the carrying member, said tubes being in direct connection with the outlet of the portioning mechanism and a supply container on said carrying member, means on said machine for moving the carrying member down and up, and means on said portioning mechanism actuated by the upward movement of said carrying member for portioning ice-cream through the outlet tubes during the upward movement thereof.

2. A filling machine for an ice-cream brick freezing machine having freezing cells arranged in rows and means for passing said rows under the filling machine, said filling machine comprising a vertically movable carrying member, a portioning mechanism having a supply container and valve-free outlet tubes and carried on said carrying member, the length of the tubes exceeding the height of the freezing cells, said tubes being movable during a filling operation from the bottom of the freezing cells to a position with their mouth above the upper edge of the freezing cells, a first actuating arm having a roller on the lower end thereof and in fixed connection with said carrying member, a first driven cam disc on said machine contacting the roller at the end of said first actuating arm, a second actuating arm, a toothed rack on the upper end of said second actuating arm, a gear wheel on said carrying member meshing with said rack, a pawl on said gear wheel engageable with said portioning mechanism for rotating said portioning mechanism, a second driven cam disc on said machine contacting the lower end of said second actuating arm, and means on said portioning mechanism actuated by the upward movement of said carrying member for portioning ice-cream through the outlets during the upward movement thereof.

3. A filling machine for an ice-cream brick freezing machine having freezing cells arranged in rows and means for passing said rows under the filling machine, said filling machine comprising a vertically movable carrying member, a portioning mechanism on said carrying member comprising a horizontal cylinder with a plurality of bores corresponding to the number of cells in a row, a freely movable piston in each cylinder, a row of vertically movable weighted piston rods with their lower ends bearing on said pistons, a stationary arm on said machine having holes therein guiding said piston rods, and stops on each piston rod engageable with said stationary arm for restricting downward movement of the piston rods, a supply container having openings therein opening into said bores, and a plurality of outlet tubes opening from said bores, length of said tubes being such that the outlet ends of the tubes reach at least substantially to the bottom of the freezing cells in the lowermost position of the carrying member, said filling machine further comprising means on said machine for moving said carrying member down and up.

4. A filling machine for an ice-cream brick freezing machine having freezing cells arranged in rows and means for passing said rows under the filling machine, said filling machine comprising a vertically movable carrying member, a stationary guiding member on which said carrying member is axially slidable, said guiding member having guiding means thereon cooperating with said carrying member for preventing rotation of said carrying member during normal axial sliding, a portioning mechanism on said carrying member having outlet tubes of a length to reach substantially to the bottom of the freezing cells in the lowermost position of the carrying member, said tubes being in direct connection with the outlet of the portioning mechanism and a supply container on said carrying member, means on said machine for moving the carrying member down and up, and means on said portioning mechanism actuated by the upward movement of said carrying member for portioning ice-cream through the outlet tubes during the upward movement thereof.

References Cited in the file of this patent

UNITED STATES PATENTS

| | | |
|---|---|---|
| 1,442,138 | Falkiner | Jan. 16, 1923 |
| 1,881,106 | Vogt et al. | Oct. 4, 1932 |
| 2,103,817 | Johnson | Dec. 28, 1937 |
| 2,208,028 | Harrington | July 16, 1940 |
| 2,258,631 | Sowden | Oct. 14, 1941 |
| 2,717,112 | Ralston | Sept. 6, 1955 |
| 2,727,657 | Bagby | Dec. 20, 1955 |

FOREIGN PATENTS

| | | |
|---|---|---|
| 425,072 | Germany | Feb. 10, 1926 |